March 19, 1963 R. E. GULBRANDSEN 3,082,350
ELECTRON DISCHARGE DEVICE HAVING IMPROVED PIN CONNECTIONS
Filed Oct. 20, 1959 2 Sheets-Sheet 1
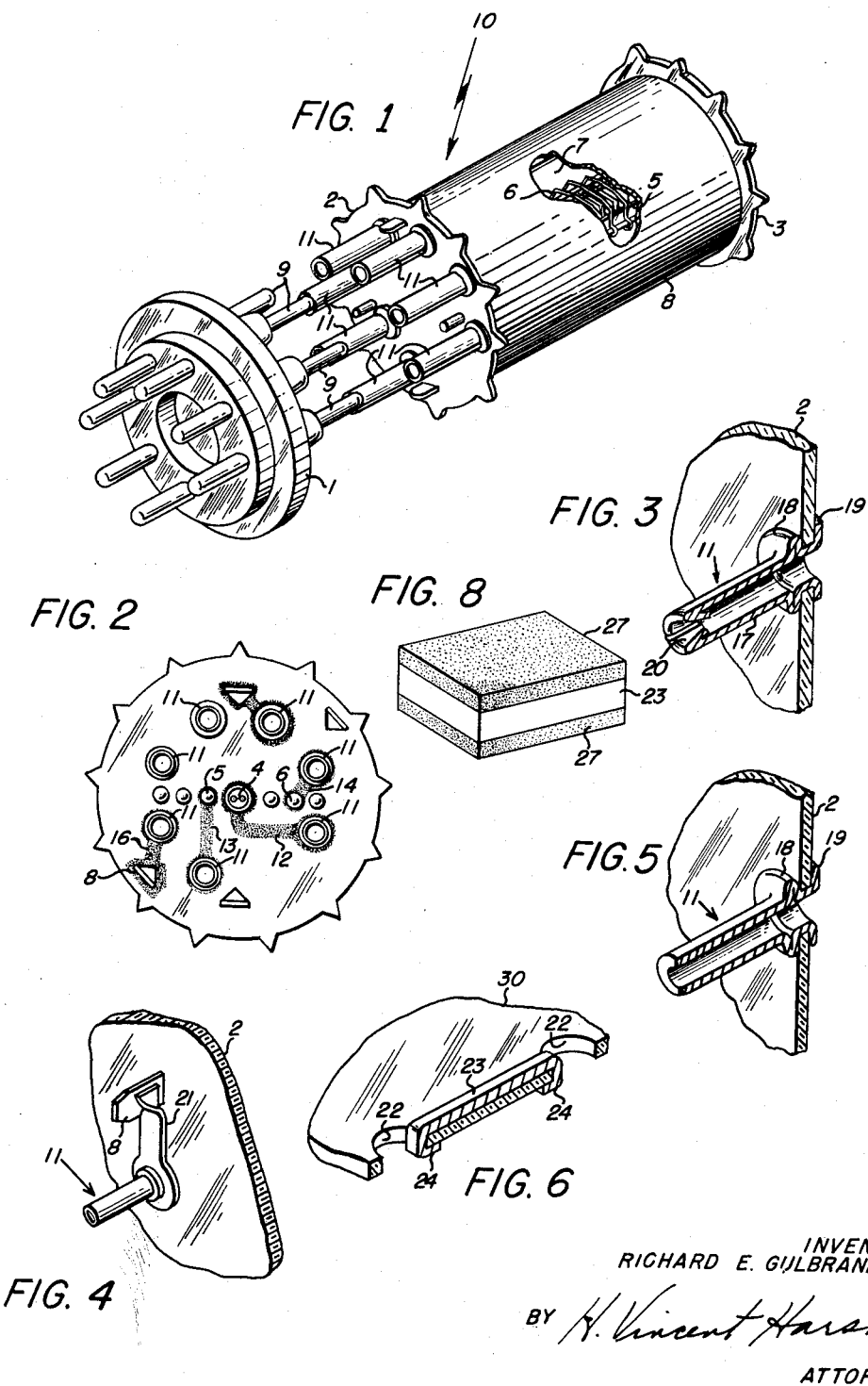
INVENTOR
RICHARD E. GULBRANDSEN
BY H. Vincent Harsha
ATTORNEY

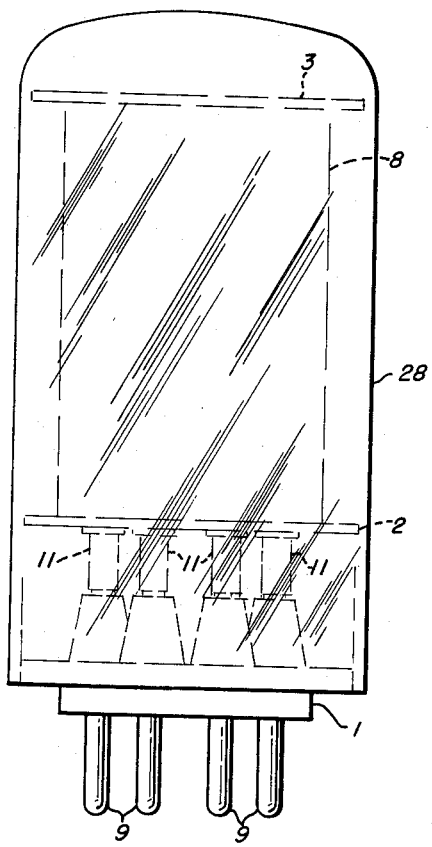
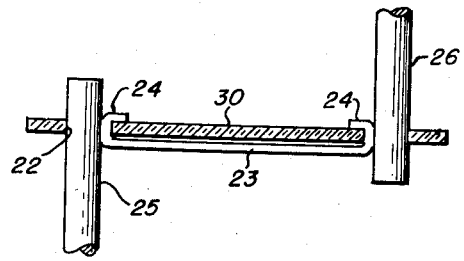

United States Patent Office 3,082,350
Patented Mar. 19, 1963

3,082,350
ELECTRON DISCHARGE DEVICE HAVING
IMPROVED PIN CONNECTIONS
Richard E. Gulbrandsen, Beverly, Mass., assignor to Raytheon Company, Waltham, Mass., a corporation of Delaware
Filed Oct. 20, 1959, Ser. No. 847,588
6 Claims. (Cl. 313—318)

This invention relates generally to the construction and manufacture of electron discharge devices, and more particularly to a novel method of attaching the insulating stem assembly to the mount, and to the improved device structure resulting therefrom.

In the manufacture of electron discharge devices, for example, of the receiving tube type, the stem assembly holding the external pin connection is attached to the operating tube elements by means of soldering or welding operations in order to electrically connect the external leads contained in the insulating base member to the electrodes of the tube. The prior art methods by which such electron discharge devices are assembled also usually require that these electrodes be individually spot welded by an operator. Prior to making the actual connection, the leads contained in the insulating base must be formed, that is, pre-cut to specified lengths and pre-bent to specified shapes in order to be in a physical position to make easy contact wtih the electrode elements. Since these stem cutting and bending operations at present account for about two-thirds of the total mount labor, any scheme which successfully eliminates them would be highly desirable. Additionally, the elimination of individual hand-welding of the various electrodes to their corresponding pin connections is also desirable. As can readily be seen, the above-described method of tube manufacture does not readily lend itself to automation, and is relatively expensive and inefficient in terms of labor cost and scrap.

In accordance with the present invention, a novel tube structure and assembly method has been devised in which the insulating mica through which the electrodes pass for support is provided with hollow reception areas designed to receive the external conducting pins held in the insulating stem assembly. The mica is also provided with electrical connections running between the reception areas and the various electrodes held in the mica. The conducting pins can therefore be made in the form of straight wires without any need for pre-forming them, and the ends of the straight wires will be received directly into the hollow reception areas. In one manner of carrying out the present inventive concept, the reception areas comprise hollow eyelets placed in the bottom mica, each of which has an electrical connection between it and the appropriate electrode with which it cooperates. The electrical connection may take the form of a ribbon connector, or may be printed circuitry. Thus, instead of individually welding each pin to its corresponding electrode, it is only necessary to insert the pins carried by the stem-assembly into the pre-formed receptacle means, and then mass-connect them in one welding or soldering step. Alternatively, the connection may be made mechanically, as by swaging.

The invention will be better understood as the following description proceeds taken in conjunction with the accompanying drawings wherein:

FIG. 1 is an exploded view of an electron tube structure showing the stem assembly and the mount prior to attachment;

FIG. 2 is a front view of the bottom mica of FIG. 1;

FIG. 3 is an enlarged, partial sectional, isometric view of one of the eyelets contained in the bottom mica of FIG. 1;

FIG. 4 is a broken-away partial sectional isometric view of the mica spacer showing another form of electrical connector running between an eyelet receptacle and a tube element;

FIG. 5 is an enlarged partial sectional isometric view of another form of eyelet;

FIG. 6 is a broken-away partial sectional view of a mica spacer showing a different form of reception area for the pins;

FIG. 7 is a partial sectional elevation view of the connector of FIG. 6 after the stem-assembly has been inserted;

FIG. 8 is an enlarged view of the connector of FIGS. 6 and 7 showing the clad coating of solder or braze material on the surface of the connector; and FIG. 9 is an elevation view of a completed tube structure in accordance with the present invention.

Referring now to the drawings, and more particularly to FIG. 1 thereof, there is shown an exploded view of an electron discharge device in accordance with the present invention as it would appear prior to the attachment of the stem base 1 to the unit section designated generally at 10. The unit section 10 comprises a plurality of tube electrodes held between a pair of insulating mica spacers 2 and 3. In the embodiment shown in FIG. 1, the electrodes include a cathode 4, shown more clearly in FIG. 2, a control grid 5, a screen grid 6, a suppressor grid 7, and an anode 8. The bottom mica 2 is provided with a plurality of reception areas for receiving the pin connections 9 which are imbedded in, and carried by, the insulating button 1 comprising the stem. In FIG. 1, these receptors take the form of a plurality of eyelets 11 which are positioned in the bottom mica 2. In order to establish an electrical connection between the pins 9 and the various electrodes to which they will finally be connected, the bottom mica is also provided with a plurality of electrical connectors running between each individual eyelet and its appropriate electrode. In FIG. 2, the electrical connectors are shown as printed circuit connections 12, 13, 14, 15, and 16.

After the unit section 10 has been prepared as shown in FIG. 1, the stem assembly 1 may have its pins 9 inserted into their corresponding eyelets in order to electrically connect the pins to the electrode elements of the tube. After the pin connections 9 have been so inserted, a permanent connection may be made between the eyelets and the pins in any suitable manner, as, for example, by soldering, welding, or mechanically swaging each eyelet to its corresponding pin. In this way, the connection of each pin to its corresponding electrode may be accomplished on a mass-joining basis thereby eliminating the separate and individual welding steps presently required. The unit section with the stem assembly attached thereto is then ready for subsequent operations in the tube manufacturing process.

In FIG. 3, there is shown in section a greatly magnified isometric view of one of the eyelets 11 carried by the mica 2. The eyelet 11 comprises a hollow elongated portion 17 which is held in place in the mica 2 by the flanged portions 18 and 19. The reception end of the eyelet 11 has a resilient concave portion 20 extending down into the eyelet so that upon insertion of an appropriate pin 9 into the eyelet, the concave portion 20 will exert a gripping action on the pin to establish mechanical and electrical connection. If desired, pressure may be applied to the outside of the eyelet 11 in order to swage the eyelet to the pin for further mechanical strength.

Instead of providing printed circuit connections between the eyelets and the electrodes of the tube, electrical connection may be made as shown in FIG. 4. In this view, the bottom mica 2 carries the eyelets 11 as in FIG.

1, only one eyelet being shown, but the printed circuit connection of FIG. 1 has been replaced by a ribbon connector 21 running between the eyelet 11 and its appropriate tube electrode, connection to the anode 8 being shown. In a similar manner, the connections between the other eyelets and their corresponding electrodes may comprise ribbon connectors.

FIG. 5 shows an alternative form of eyelet 11 in which no concave portion is provided, and which may receive its pin connection in a force-fitted manner. As with the embodiment described in FIG. 1, once the pin has been inserted into the eyelet 11, mechanical pressure may be applied to the outside surface of the eyelet, if desired, in order to assure good structural and electrical contact between the eyelet and the pin.

In FIG. 6, there is shown a still further structural arrangement for carrying out the present invention. In this figure, an appropriate bottom mica spacer 30 is provided with a plurality of holes 22 having an electrically conducting member 23 extending along the surface of the mica and into the holes. In order to hold the conducting member 23 in position, a clamp portion 24 may extend through each of the holes and be bent over to securely grip the opposite surface of the mica. The stem assembly of the tube may then be inserted into the bottom mica 30 with an appropriate pin 25 being received into its hole 22 so that contact is made between the pin and one end of the conducting member 23 as shown in FIG. 7. The other end of the member 23 contacts an appropriate electrode element 26. As a further modification, the member 23 may be provided with a depressed channel in the areas where the member 23 contacts the pin 25 and the electrode element 26. Upon insertion of the stem assembly into the bottom mica, each pin connection will be received into its appropriate hole, thus eliminating the need for the eyelets shown in FIG. 1. In order to establish the electrical connection, the conducting connector 23 may be pre-clad with a coating of solder or brazing material 27 as shown in FIG. 8. The unit may then be heated to fuse the coated connector 23 to the elements 25 and 26, the heating taking place, for example, during the subsequent bombing or sealing operations which are conventional in tube manufacture, or during a secondary mass-welding operation.

In FIG. 9, there is shown the completed tube structure after the sealing and exhausting operations have been performed in order to enclose the tube elements in the exterior envelope 28.

Although there have been described what are considered to be preferred embodiments of the present invention, various adaptations and modifications thereof may be made without departing from the spirit and scope of the present invention as defined in the appended claims.

What is claimed is:

1. In an electron discharge device, an insulating electrode-supporting member, electrodes mounted on said supporting member, a receptacle in said supporting member for receiving an external pin member of such electron discharge device, conductive means extending between and electrically connecting one of said electrodes to said receptacle to electrically interconnect said electrode with an external pin member positioned in said receptacle, an insulating stem member adjacent said electrode-supporting member, and a conductive external pin member extending through said stem member with the inner end of said pin member positioned within said receptacle.

2. In an electron discharge device, the combination of claim 1 wherein said conductive means comprises a printed circuit conductive path located on a surface of the electrode-supporting member in direct electrical contact with said electrode and receptacle.

3. In an electron discharge device, the combination of claim 1 wherein said conductive means comprises a metallic connector member located on a surface of the electrode-supporting member in direct electrical contact with said electrode and receptacle.

4. In an electron discharge device, an insulating electrode-supporting member, a plurality of electrodes mounted on said supporting member, a plurality of receptacles in said supporting member for receiving respective ones of a plurality of external pin members of such electron discharge device, conductive connectors extending from the several electrodes to respective ones of said receptacles to electrically interconnect the several electrodes with external pin members positioned in such respective receptacles, an insulating stem member, and a plurality of external pin members extending through said stem member with the inner end of each of said pin members being positioned within a respective one of said receptacles.

5. In an electron discharge device, an insulating electrode-supporting member, an electrode mounted on said supporting member, an aperture in said supporting member for receiving an external pin member of such electron discharge device, an insulating stem member adjacent said electrode-supporting member, an external pin member extending through the stem member with the inner end thereof positioned with said aperture in the electrode-supporting member, and a conductive member extending between said electrode and said aperture to electrically interconnect said electrode with said external pin member positioned in said aperture.

6. In an electron discharge device, the combination of claim 5, wherein said conductive member comprises a metallic connector member having a position extending into said aperture and in conductive contact with said pin member therein.

References Cited in the file of this patent

UNITED STATES PATENTS

| | | |
|---|---|---|
| 2,658,183 | Klostermann et al. | Nov. 3, 1953 |
| 2,688,737 | Oskerka et al. | Sept. 7, 1954 |
| 2,752,580 | Shewmaker | June 26, 1956 |
| 2,812,471 | Jarboe | Nov. 4, 1957 |
| 2,841,737 | Klopping | July 1, 1958 |
| 2,844,807 | McMulkin | July 22, 1958 |
| 2,972,728 | Cole | Feb. 21, 1961 |

FOREIGN PATENTS

| | | |
|---|---|---|
| 226,329 | Switzerland | July 1, 1943 |
| 906,861 | France | May 28, 1945 |
| 68,590 | Netherlands | Sept. 15, 1951 |